W. W. KNOWLES.
Cotton-Presses.
No. 5,816. Reissued March 31, 1874.
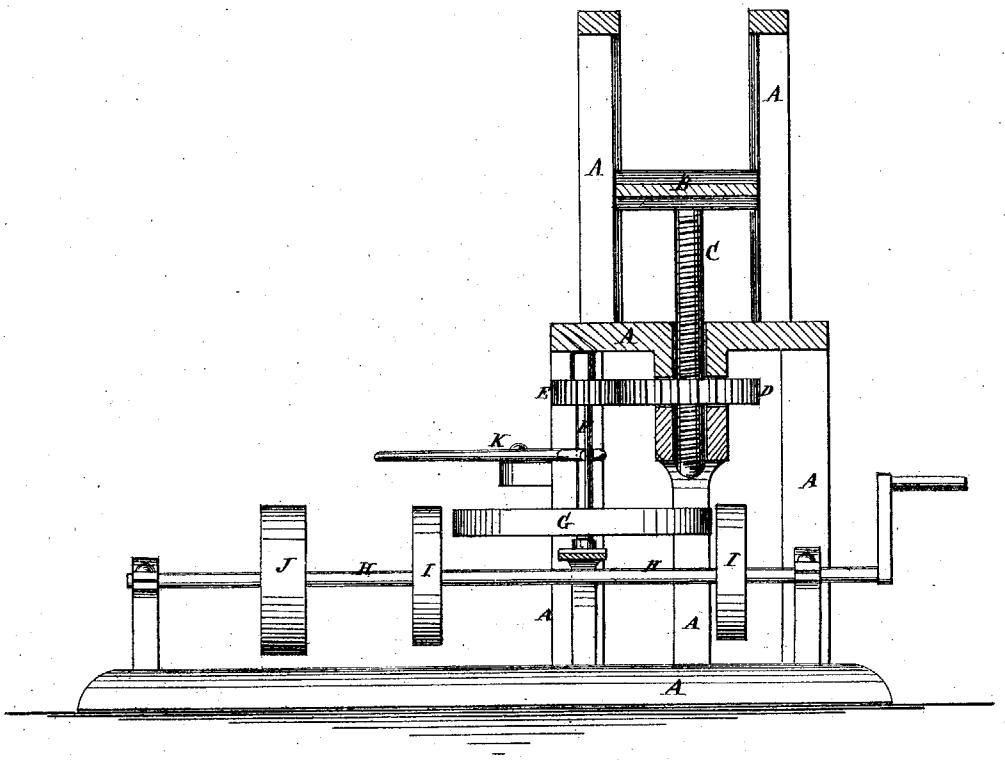
WITNESSES.
A. W. Almqvist
J. Sedgwick
INVENTOR.
W. W. Knowles
BY
Munn & Co.
ATTORNEYS.
AM. PHOTO-LITHOGRAPHIC Co. N. Y. (OSBORNE'S PROCESS.)

UNITED STATES PATENT OFFICE.

WILLIAM WADSWORTH KNOWLES, OF BASTROP, TEXAS.

IMPROVEMENT IN COTTON-PRESSES.

Specification forming part of Letters Patent No. 106,833, dated August 30, 1870; reissue No. 5,816, dated March 31, 1874; application filed January 5, 1874.

*To all whom it may concern:*

Be it known that I, WILLIAM W. KNOWLES, of Bastrop, in the county of Bastrop and State of Texas, have invented a new and useful Improvement in Cotton-Press; and I do hereby declare that the following is a full, clear, and exact description thereof, which will enable others skilled in the art to make and use the same, reference being had to the accompanying drawings forming a part of this specification.

The figure is a detailed sectional view of my improved press.

The invention consists in operating the nut of a follower-screw by means of a drive-pinion, whose own shaft is actuated alternately in opposite directions, by a friction-wheel, as hereinafter described, and pointed out in the claim.

A represents the frame-work of the press. B is the follower, by the movement of which the bale is pressed, and which moves up and down upon guides or ways in the ordinary manner. C is the screw, the upper end of which is rigidly attached to the center of the follower B. D is a large gear-wheel, eight feet, more or less, in diameter, in the center of which is formed a hole, having a screw-thread cut in it, fitting into the screw-thread of the screw C, or having a nut secured to its center, through which the said screw C passes. The wheel D is secured and supported in place by suitable supports attached to the frame A, so that by revolving the said wheel in one or the other direction the screw C will be forced up or down, carrying with it the follower B. Into the teeth of the large gear-wheel B mesh the teeth of the pinion or small gear-wheel E, which is eighteen inches, more or less, in diameter, and which is attached to the vertical shaft F. The upper end of the shaft F revolves in bearings attached to the frame A, and its lower end revolves in a step attached to the frame A, and so arranged that the lower end of the said shaft F may have a lateral movement. To the lower part of the shaft F is rigidly attached a large friction-wheel, G. H is a horizontal shaft, placed directly below the vertical shaft F, and in the same vertical plane with it, and which revolves in bearings attached to the lower part of the frame A. To the shaft H are rigidly attached two friction-wheels, I, at such a distance apart as to just clear the friction-wheel G, so that when the lower end of the shaft F is moved a little in one or the other direction, the face of the friction-wheel G will come in contact with one or the other of the friction-wheels I, and turn the screw C up or down, according to the direction in which the lower end of the shaft F is moved.

This construction allows the screw C to be run up or down, or to be allowed to stand still, while the driving-shaft H revolves continuously in the same direction.

The shaft H may be driven by steam, water, or other power, applied to it by means of the pulley J, or in any other convenient manner.

The lower end of the shaft F is moved to change the direction of the motion of the screw C, or to allow the said screw to stand still, by means of the lever K, which is pivoted to some suitable support attached to the frame A, and the forked end of which rides upon the shaft F.

Having thus described my invention, I claim as new, and desire to secure by Letters Patent—

The combination, with follower screw C and a spur-wheel, D, forming the nut thereof, of the shaft F, having drive-pinion at one end, and at the other a friction-wheel, adapted to be alternately rotated in opposite directions, for the purpose set forth.

WILLIAM WADSWORTH KNOWLES.

Witnesses:

J. C. BUCHANAN,

GEO. W. POWELL.